(12) United States Patent
Ai et al.

(10) Patent No.: US 9,386,598 B2
(45) Date of Patent: *Jul. 5, 2016

(54) METHOD AND APPARATUS FOR SYNCHRONIZATION PROCESSING

(75) Inventors: Jianxun Ai, Shenzhen (CN); Hengxing Zhai, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 539 days.

This patent is subject to a terminal disclaimer.

(21) Appl. No.: 13/052,307

(22) Filed: Mar. 21, 2011

(65) Prior Publication Data

US 2011/0164544 A1    Jul. 7, 2011

Related U.S. Application Data

(63) Continuation of application No. PCT/CN2009/071109, filed on Mar. 31, 2009.

(30) Foreign Application Priority Data

Sep. 22, 2008    (CN) .......................... 2008 1 0166215

(51) Int. Cl.
*H04H 20/71*    (2008.01)
*H04W 72/12*    (2009.01)

(52) U.S. Cl.
CPC ...... *H04W 72/1242* (2013.01); *H04W 72/1236* (2013.01)

(58) Field of Classification Search
None
See application file for complete search history.

(56) References Cited

U.S. PATENT DOCUMENTS

| 8,005,085 | B2 * | 8/2011 | Bakker et al. ................. 370/390 |
| 2005/0281278 | A1 * | 12/2005 | Black et al. .................... 370/412 |
| 2007/0223484 | A1 | 9/2007 | Crowle et al. ................. 370/394 |
| 2008/0101334 | A1 | 5/2008 | Bakker et al. ................. 370/350 |
| 2012/0093058 | A1 * | 4/2012 | Mantravadi et al. ........... 370/312 |

FOREIGN PATENT DOCUMENTS

| CN | 101043265 A | 9/2007 | ............... H04B 7/26 |
| CN | 101047492 A | 10/2007 | ............... H04L 7/04 |
| EP | 1912377 A1 | 4/2008 | ............... H04L 12/18 |
| EP | 1919235 A1 | 5/2008 | ............... H04Q 7/38 |
| WO | WO2008/103829 A2 | 8/2008 | ............... H04L 12/56 |

* cited by examiner

*Primary Examiner* — Faruk Hamza
*Assistant Examiner* — Thinh Tran

(57) ABSTRACT

The present invention discloses a method and an apparatus for synchronization processing, wherein the method for synchronization processing includes: a designated network element receiving multiple data bursts of a Multimedia Broadcast Multicast Service transmitted by its upper layer network element, wherein data packets in the data bursts carry timestamp information; for multiple data bursts whose timestamp locates before a current available transmitting time interval, the designated network element starting to transmit the data packets belonging to the multiple data bursts in turn from the start time of the current available transmitting time interval. By means of the present invention, the synchronization between the lower layer network elements can be kept and the performance of a system can be stabilized.

12 Claims, 5 Drawing Sheets

METHOD AND APPARATUS FOR SYNCHRONIZATION PROCESSING

This is a continuation of International Application PCT/CN/2009/071109, with an International Filing Date of Mar. 31, 2009, which claims priority to Chinese Application No. 200810166215.5, filed Sep. 22, 2008, each of which is incorporated by reference.

FIELD OF THE INVENTION

The present invention relates to communication field, and especially to a method and an apparatus for synchronization processing.

BACKGROUND OF THE INVENTION

With the development of the Internet network, huge multimedia services take emergence, and people's needs on mobile communication are not limited to telephone and message services. Currently, an application service is introduced into the multimedia services and has a feature that multiple users can receive the same data at the same time, for example, video on demand, television broadcast, video conference, online education, interactive game, etc.

An MBMS (Multimedia Broadcast Multicast Service) technology is put forward to use resources of a mobile network effectively. The MBMS is a point-to-multipoint service that one data source sends data to multiple users, and network resources can be shared through this service, including sharing resources of a mobile core network and an access network, especially sharing air interface resources, moreover, the MBMS in 3GPP can realize not only multicast and broadcast of message-type services of pure-text and low-rate, but also multicast and broadcast of multimedia services of high-rate.

Since the MBMS service is a service directed to the whole network, a same MBMS service may be established at different lower layer network element nodes. FIG. 1 is a flow chart of a method for synchronization processing of a MBMS service of multiple network elements in the prior art, which comprises the following processing.

Step S102, an upper layer network element sends MBMS service data packet(s) to respective lower layer network elements, and the service data packet(s) bears service data and carries timestamp information, data packet sequence number information, accumulated service data length information, etc. The upper layer network element marks one or more consecutive service data packets with same timestamp information, and the data packets marked with the same timestamp make up of a data burst or are referred to as a synchronization sequence.

Step S104, the lower layer network elements need to perform an RLC (Radio Link Control) protocol layer concatenation processing on the service data carried by the service data packets in a same data burst.

Step S105, the lower layer network elements sequentially send, at wireless interfaces, the services carried by service data packets marked by the timestamp in the same data burst from the time point indicated by the timestamp, since the above information transmitted by the upper layer network element to the respective lower layer network elements is completely consistent with each other, the respective lower layer network elements can perform completely consistent processing, thereby realizing synchronously sending of the MBMS service among cells of the respective lower layer network elements.

Currently, the timestamp information of each data packet can be set in the following two manners.

Manner 1: the upper layer network element marks a timestamp according to the time when it receives the service data packets, and service data packets received within a time interval with a specific length are marked with the same timestamp, wherein the time interval with the specific length is called as a synchronization sequence length.

Manner 2: the upper layer network element virtualizes the RLC protocol layer processing of the lower layer network elements, and marks the service data packets on which the RLC concatenation processing should be performed with the same timestamp according to the result of the virtualized RLC processing.

It can be seen that the timestamp is set depending on the time when the service data packets arrive at the upper layer network element, and thus the timestamp intervals of the service data packets cannot be determined.

One MBMS service can be transmitted at wireless interfaces in a manner of TDM (Time Division Multiplexing) to use a wireless interface channel, and the TDM manner comprises the following parameters: a TDM period, a TDM offset and a TDM repeat length. Specifically, one MBMS service is transmitted, within a TDM period it allocates, from the (TDM offset)$^{th}$ TTI and within consecutive TTIs (transmission time interval) in a number of TDM repeat length, wherein the TDM repeat period is no more than 9, and the length of the TTI that can be used by the MEMS service is 40 or 80 ms.

When data is transmitted by using the mode of the TDM, since the time of sending the MBMS service at the wireless interfaces is not consecutive, the timestamp information cannot directly correspond to a start time when the wireless interfaces can send the MBMS service. Moreover, the interval of adjacent timestamps are different with the interval of adjacent available transmitting time, it may happen that the intervals among multiple timestamps are shorter than the interval of the available transmitting time interval of the wireless interfaces, that is, different timestamp of different data bursts is within a last available transmitting time interval and a next available transmitting time interval, and thus the lower layer network elements belonging to a same upper layer network element cannot perform synchronized processing on the same data burst.

SUMMARY OF THE INVENTION

The present invention is proposed in consideration of the problem in the prior art that the lower layer network elements belonging to a same upper layer network element cannot perform synchronization processing on the same data burst. Therefore, the present invention mainly aims to provide an improved synchronization processing solution to solve the above problem.

To achieve the above purpose, according to one aspect of the present invention, a method for synchronization processing is provided.

The method for synchronization processing according to the present invention comprises: a designated network element receiving multiple data bursts of a Multimedia Broadcast Multicast Service transmitted by its upper layer network element, wherein data packets in the data bursts carry timestamp information; for multiple data bursts whose timestamp locates before a current available transmitting time interval, the designated network element starting to transmit the data packets belonging to the multiple data bursts in turn from the start time of the current available transmitting time interval.

According to another aspect of the present invention, an apparatus for synchronization processing is provided.

The apparatus for synchronization processing according to the present invention comprises: receiving means, configured to receive multiple data bursts of a Multimedia Broadcast Multicast Service transmitted by an upper layer network element, wherein data packets in the data bursts carry timestamp information; and processing means, configured to, for multiple data bursts whose timestamp locates before a current available transmitting time interval, start to transmit the data packets belonging to the multiple data bursts in turn from the start time of the current available transmitting time interval.

By way of at least one of the above technical solutions of the present invention, the synchronization among each of the lower layer network elements can be kept and the performance of a system can be stabilized by sending, at a predetermined time, multiple data bursts whose time stamp locates before the current available transmitting time interval.

BRIEF DESCRIPTION OF THE ACCOMPANYING DRAWINGS

The accompanying drawings are used to provide further understanding of the present invention and form a part of the description, and they are used to explain the present invention together with the embodiments of the present invention without unduly limiting the scope of the present invention, wherein.

DETAILED DESCRIPTION OF THE INVENTION

Function Overview

As discussed above, currently when the TDM manner is used to send data, the following problem appears: the interval between multiple timestamps is shorter than the interval of transmitting time intervals that can be used by the wireless interfaces, that is, different timestamp of multiple data bursts is within the last available transmitting time interval and a next available transmitting time interval, and the lower layer network elements belonging to the same upper layer network element cannot perform synchronization processing on the same data burst. With respect to this problem, the present invention puts forward a solution for synchronization processing, and this solution keeps the synchronization of respective lower layer network elements by sending, at a predetermined time, data packets in multiple data bursts whose timestamp locates before the current available transmitting time interval.

The present invention will be described in detail hereinafter in combination with the accompanying drawings. It should be noted that the embodiments of the present invention and the features of the embodiments can be combined with each other in the case of no conflict.

Method Embodiments

A method for synchronization processing is provided according to an embodiment of the present invention.

Figure 1:
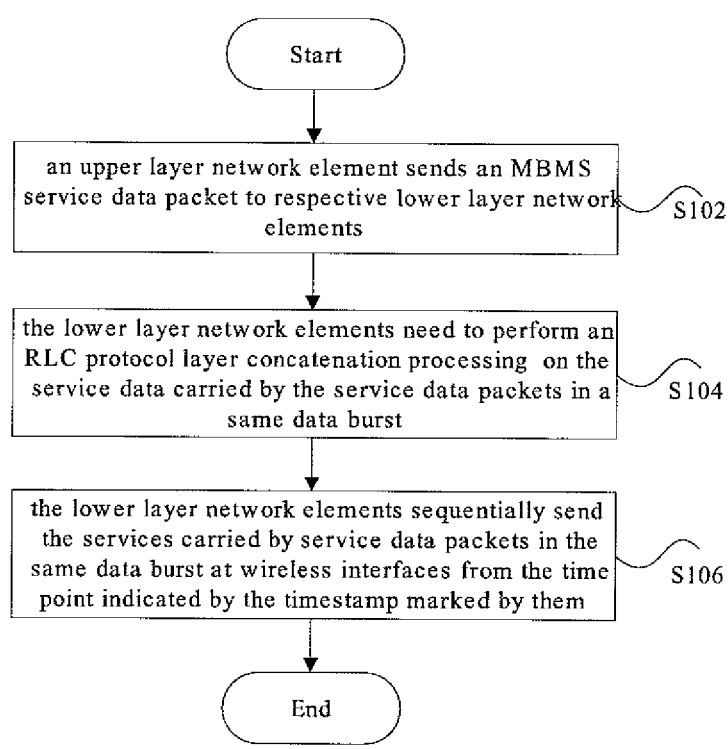
FIG. 1 is a flow chart of a method for synchronization processing of the MBMS services of multiple network elements in the prior art.
Figure 2:
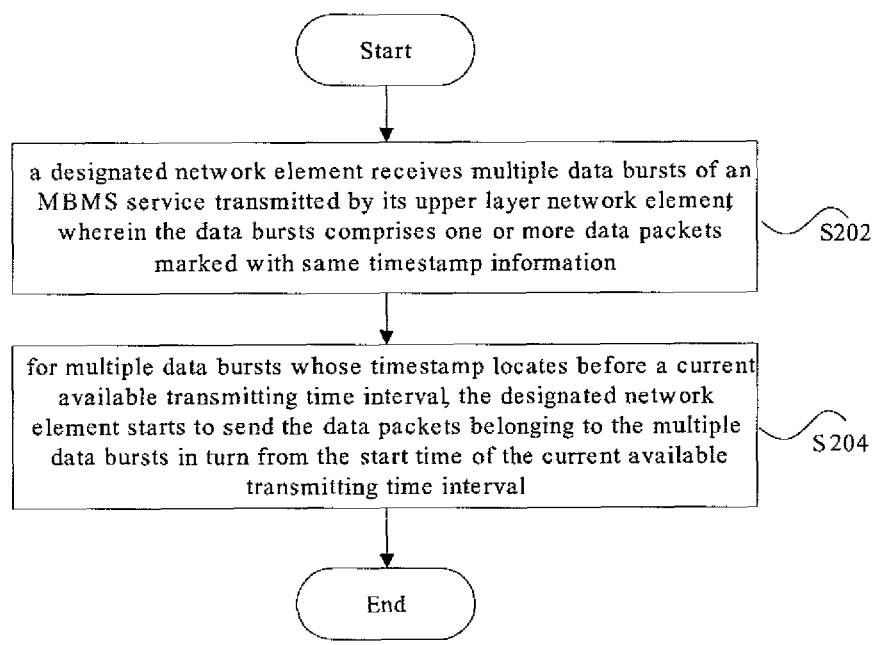
FIG. 2 is a flow chart of a method for synchronization processing according to an embodiment of the present invention.

FIG. 2 is a flow chart of a method for synchronization processing according to an embodiment of the present invention, and as shown in FIG. 2, the method comprises the following steps.

Step S202, a designated network element receives multiple data bursts of an MBMS service transmitted by its upper layer network element, wherein the data bursts herein comprises one or more data packets marked with same timestamp information.

Step S204, for multiple data bursts whose timestamp locates before a current available transmitting time interval, the designated network element starts to send the data packets belonging to the multiple data bursts in turn from the start time of the current available transmitting time interval.

By means of the technical solution provided by the embodiment of the present invention, the synchronization among each of the lower layer network elements can be kept and the performance of a system can be improved by sending, at a predetermined time, multiple data bursts whose timestamp locates before the current available transmitting time interval.

The designated network element in the Step S204 can use following three manners to start to send data packets belonging to the multiple data bursts from the start time of the current available transmitting time interval.

Manner 1: the designated network element sequentially performs an RLC concatenation processing on data packets belonging to different data bursts according to the order of timestamps and sends them.

Manner 2: the designated network element performs the RLC concatenation processing on data packets belonging to the same data burst, and the data packets which belong to different data bursts and have been subjected to RLC processing can be transmitted in a same TTI.

Manner 3: the designated network element performs the RLC concatenation processing on data packets belonging to the same data burst, and the data packets which belong to different data bursts and have been subjected to RLC processing are transmitted in different TTIs.

In the above, the available transmitting time interval is a time period which is used to send the data packets, for example, when the data packets is transmitted in the TDM manner, the available transmitting time interval can be a time resource for sending the data packets.

The current available transmitting time interval is a next wireless interface time resource for sending the MBMS service.

Figure 3:
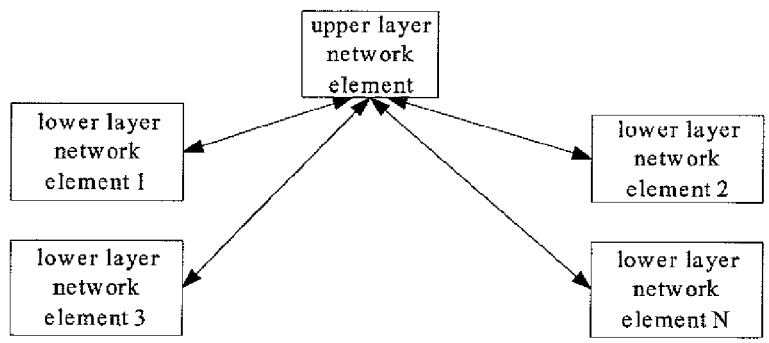
FIG. 3 is a block diagram of a logical structure of an upper layer network element and lower layer network elements according to the present invention.

FIG. 3 is a block diagram of a logical structure of an upper layer network element and lower layer network elements, and it can be seen that one upper layer network element is connected with and performs signaling interaction with multiple lower layer network elements. It should be noted that one upper layer network element and one or more lower layer network elements (that is, the above designated network element) belonging to the upper layer network element can be an identical network elements or different network elements in physical functions, and it is just a logical division to divide them to an upper layer network element and lower layer network elements, and this is to achieve cooperatively a function of service synchronization. That is, several identical or different physical network elements are divided into one upper layer network element and several lower layer network elements according to logical functions, and these network elements cooperate with each other to realize sending the MBMS service in a manner of multi-cell combination among cells of the lower layer network elements.

In the above, the upper layer network element and the lower layer network elements can be, but not limited to, the following combination modes of network elements.

Combination 1: in MBMS service synchronization networking of a UTRAN (Universal Terrestrial Radio Access Network) system, the upper layer network element is an upper layer RNC (Radio Network Controller), and the lower layer network element is a lower layer RNC, wherein the interface between the upper layer network element and the lower layer network element is an Iur interface, and in this combination, the upper layer network element and the lower layer network element are network elements having same physical functions.

Combination 2: in MBMS service synchronization networking of an HSPA (enhanced High Speed Packet Access) system, the upper layer network element is a master control RNC or a master NodeB (i.e., master NB+), and the lower layer network element is a slave NodeB (that is, slave NB+), wherein the interface between the upper layer network element and the lower layer network element is an Iur interface, and in this combination, the upper layer network element and the lower layer network element are network elements having same physical functions and different logical functions.

Combination 3: in MBMS service synchronization networking of an LTE (Long-Term Evolution) system, the upper layer network element is an MGW (MBMS Gateway) or an MCE (Multi-cell/multicast Coordination Entity), and the lower layer network element is an evolved Node B (E-UTRAN Node B), wherein the interface between the upper layer network element and the lower layer network element is an M2 interface.

Embodiment 1

The MBMS service is transmitted at the wireless interface discontinuously, and an available transmitting time interval of the wireless interface is configured at a certain time interval.

Figure 4:
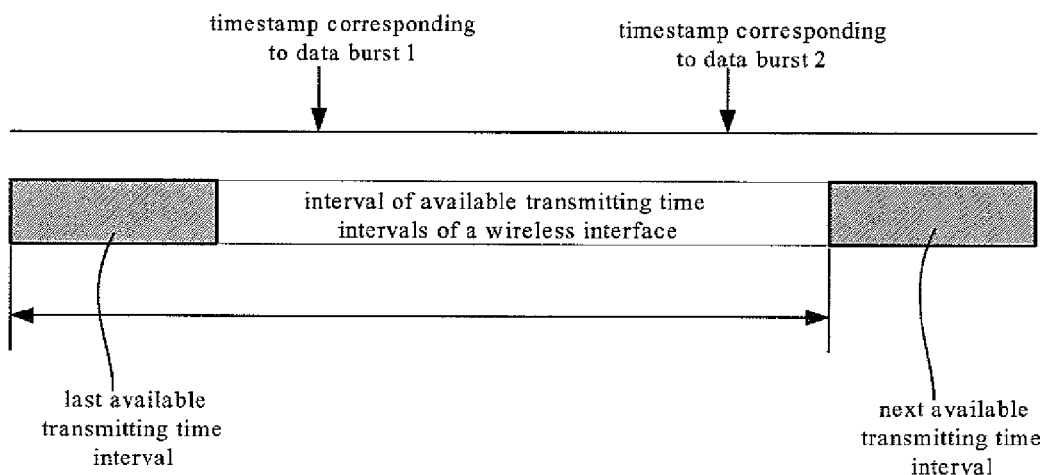
FIG. 4 is a schematic view of a method for synchronization processing according to embodiment 1 of the present invention.

FIG. 4 is a schematic view of a method for synchronization processing according to embodiment 1 of the present invention, and as shown in FIG. 4, the lower layer network element receives data packets of two data bursts with different timestamp information, that is, a first data burst and a second data burst, and the timestamp of the two data bursts locates before a next available transmitting time interval and after the last available transmitting time interval, that is, the time when the lower layer network element receives multiple data packets is located between two adjacent available transmitting time intervals.

The lower layer network element buffers the data packets in the two data bursts, and may perform processing in the following two ways when performing the RLC processing on the data packets:

Processing manner 1: the lower layer network element performs an RLC concatenation processing on all the data packets in the two data bursts; and Processing manner 2: the lower layer network element respectively performs the RLC concatenation processing on data packets in each of the data bursts, and does not perform the RLC concatenation processing on data packets belonging to different data bursts, that is, it performs the RLC concatenation processing on data packets belonging to the first data burst and performs the RLC concatenation processing on data packets belonging to the second data burst.

The lower layer network element starts to sequentially send service data carried in the two data bursts at the wireless interface from a latter one (i.e., the next available transmitting time interval mentioned above) of two adjacent available transmitting time intervals, and also, for the processing manner 2, data packets belonging to one data burst and subjected to the RLC concatenation processing can be transmitted in one TTI, and data packets belonging to different data bursts and subjected to the RLC concatenation processing can also be transmitted in a same TTI.

In addition, if the service data of the above two data bursts cannot be transmitted in the next available transmitting time interval, the lower layer network element continues sending the service data of the data bursts in a subsequent available transmitting time interval.

Embodiment 2

The MBMS service is transmitted at the wireless interface discontinuously, and an available transmitting time interval of the wireless interface is configured at a certain time interval.

Figure 5:
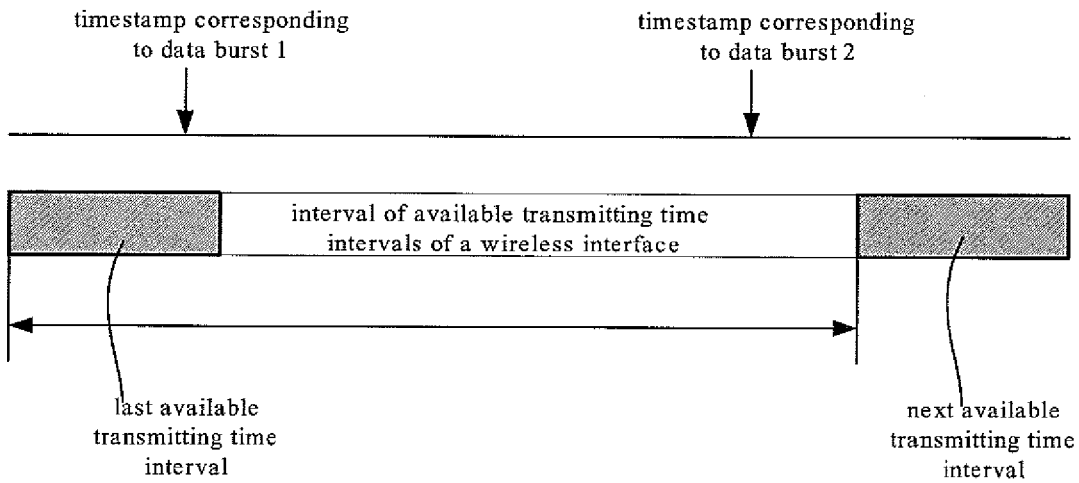
FIG. 5 is a schematic view of a method for synchronization processing according to embodiment 2 of the present invention.

FIG. 5 is a schematic view of a method for synchronization processing according to embodiment 2 of the present invention, and as shown in FIG. 5, the lower layer network element receives data packets of two data bursts with different timestamp information, wherein the timestamp of data burst 1 locates in the last available transmitting time interval; the timestamp of data burst 2 locates before a next available transmitting time interval and after the last available transmitting time interval, that is, in a time interval between two adjacent available transmitting time intervals.

The lower layer network element buffers the data packets in the two data bursts, and may perform processing in the following two ways when performing the RLC processing on the data packets:

Processing manner 1: the lower layer network element performs an RLC concatenation processing on all the data packets in the two data bursts; and Processing manner 2: the lower layer network element respectively performs the RLC concatenation processing on data packets in each of the data bursts and does not perform the RLC concatenation processing on data packets belonging to different data bursts, that is, it performs the RLC concatenation processing on data packets belonging to the first data burst and performs the RLC concatenation processing on data packets belonging to the second data burst.

The lower layer network element starts to sequentially send service data carried in the two data bursts at the wireless interface from a latter one (i.e., the next available transmitting time interval mentioned above) of two adjacent available transmitting time intervals.

In addition, if the service data of the above two data bursts cannot be transmitted in the next available transmitting time interval, the lower layer network element continues sending the service data of the data bursts in a subsequent available transmitting time interval.

Apparatus Embodiment

According to an embodiment of the present invention, an apparatus for synchronization processing is provided, which may be used to realize the above method for synchronization processing provided by the above method embodiments.

Figure 6:
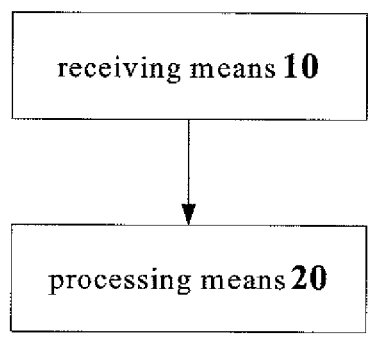
FIG. 6 is a block diagram of an apparatus for synchronization processing according to an embodiment of the present invention.

FIG. 6 is a block diagram of a structure of an apparatus for synchronization processing according to an embodiment of the present invention, and as shown in FIG. 6, the apparatus comprises receiving means 10 and processing means 20, wherein the receiving means 10 is configured to receive multiple data bursts of an MBMS service transmitted by its upper layer network element; and the processing means 20 is configured to, for multiple data bursts whose timestamp locates before a current available transmitting time interval, start to send the data packets belonging to the multiple data bursts by the designated network element from the start time of the current available transmitting time interval, wherein the available transmitting time interval is a time period for sending the data packets, and the processing means 20 can be connected to the receiving means 10.

In the above, the processing means 20 is also configured to send, in the current available transmitting time interval, data bursts that were not transmitted in a last available transmitting time interval, or configured not to send, in the current available transmitting time interval, data bursts that were not transmitted in the last available transmitting time interval.

Figure 7:
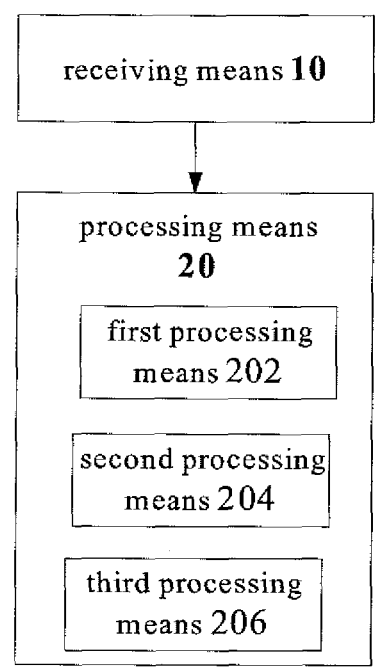
FIG. 7 is a block diagram of a specific structure of an apparatus for synchronization processing according to the embodiment of the present invention.

FIG. 7 is a block diagram of a specific structure of the apparatus shown in FIG. 6, and as shown in FIG. 7, the above processing means also comprises first processing means 202, second processing means 204 and third processing means 206, wherein the first processing means 202 is configured to sequentially perform an RLC concatenation processing on data packets belonging to different data bursts according to the order of timestamps and send the same;

the second processing means 204 is configured to respectively perform the RLC concatenation processing on data packets belonging to a same data burst, and to send, in the same TTI, data packets which belong to different data bursts and have been subjected to RLC concatenation processing; and the third processing means 206 is configured to respectively perform the RLC concatenation processing on data packets belonging to the same data burst, and to only send, in one TTI, data packets which belong to the same data burst and have been subjected to RLC concatenation processing.

By way of the apparatus for synchronization processing provided by the embodiment of the present invention, the synchronization between the lower layer network elements can be kept and the performance of a system can be improved by sending, at a predetermined time, multiple data bursts whose timestamp locates before the current available transmitting time interval.

As discussed above, by means of the method and/or the apparatus for synchronization processing provided by the present invention, the synchronization between the lower layer network elements can be kept and the performance of a system can be stabilized by sending, at a predetermined time, multiple data bursts whose timestamp locates before the current available transmitting time interval. In this way, when the upper layer network element sets the timestamp information of the data bursts, the configuration details of the wireless interface need not to be considered, a reasonable processing can still be performed when an interval between the timestamps of the data bursts set by the upper layer network element is shorter than the interval between wireless interface available transmitting time intervals, and a processing synchronization among respective lower layer network elements can be kept.

Described above are just preferable embodiments of the present invention and are not intended to restrict the present invention. For those skilled in the art, the present invention may have various changes and variations. Any modifications, equivalent substitutions, improvements, etc. within the spirit and principle of the present invention shall all be included in the scope of protection of the present invention.

What is claimed is:

1. A method for synchronization processing, comprising:
a designated network element receiving multiple data bursts of a Multimedia Broadcast Multicast Service transmitted by its upper layer network element, wherein data packets in the data bursts carry timestamp information;
for multiple data bursts whose timestamp locates before a current available transmitting time interval, the designated network element starting to transmit the data packets belonging to the multiple data bursts in turn from the start time of the current available transmitting time interval, wherein different timestamp of multiple data bursts locates between a last available transmitting time interval and a next available transmitting time interval;
wherein the current available transmitting time interval is the next time interval of wireless interface resources used to transmitting the data packets and the Multimedia Broadcast Multicast Service is transmitted at wireless interfaces in a manner of Time Division Multiplexing (TDM) to use a wireless interface channel.

2. The method according to claim 1, wherein
the designated network element sequentially performs an RLC concatenation processing on data packets belonging to different data bursts according to the order of timestamps; or
the designated network element performs an RLC concatenation processing on data packets belonging to a same data burst, and transmits, in a same TTI, data packets which belong to different data bursts and have been subjected to RLC processing; or
the designated network element performs an RLC concatenation processing on data packets belonging to a same data burst, and transmits, in different TTIs, data packets which belong to different data bursts and have been subjected to RLC processing.

3. The method according to claim 2, wherein the operation that the designated network element starts to transmit the data packets belonging to the multiple data bursts in turn from the start time of the current available transmitting time interval is:
transmitting, in the current available transmitting time interval, data bursts that were not transmitted in a last available transmitting time interval; or
not transmitting, in the current available transmitting time interval, data bursts that were not transmitted in the last available transmitting time interval.

4. The method according to claim 2, wherein the data bursts are a group of data packets marked with same timestamp information.

5. The method according to claim 1, wherein the operation that the designated network element starts to transmit the data packets belonging to the multiple data bursts in turn from the start time of the current available transmitting time interval is:
transmitting, in the current available transmitting time interval, data bursts that were not transmitted in a last available transmitting time interval; or
not transmitting, in the current available transmitting time interval, data bursts that were not transmitted in the last available transmitting time interval.

6. The method according to claim 1, wherein the data bursts are a group of data packets marked with same timestamp information.

7. An apparatus for synchronization processing, which locates at a designated network element side, comprising:
- receiving means, configured to receive multiple data bursts of a Multimedia Broadcast Multicast Service transmitted by an upper layer network element, wherein data packets in the data bursts carry timestamp information, wherein the Multimedia Broadcast Multicast Service is transmitted at wireless interfaces in a manner of Time Division Multiplexing (TDM) to use a wireless interface channel; and
- processing means, configured to, for multiple data bursts whose timestamp locates before a current available transmitting time interval, start to transmit the data packets belonging to the multiple data bursts in turn from the start time of the current available transmitting time interval, wherein different timestamp of multiple data bursts locates between a last available transmitting time interval and a next available transmitting time interval;
- wherein the current available transmitting time interval is the next time interval of wireless interface resources used to transmitting the data packets.

8. The apparatus according to claim 7, wherein the processing means comprises:
- first processing means, configured to perform an RLC concatenation processing on data packets belonging to different data bursts according to the order of timestamps; or
- second processing means, configured to respectively perform the RLC concatenation processing on data packets belonging to a same data burst, and to transmit, in a same TTI, data packets which belong to different data bursts and have been subjected to RLC processing; or
- third processing means, configured to respectively perform the RLC concatenation on data packets belonging to the same data burst, and transmit, in different TTIs, data packets which belong to different data bursts and have been subjected to RLC processing.

9. The apparatus according to claim 8, wherein the data bursts are a group of data packets marked with same timestamp information.

10. The apparatus according to claim 7, wherein the processing means is also configured to transmit, in the current available transmitting time interval, data bursts that were not transmitted in a last available transmitting time interval, or configured not to transmit, in the current available transmitting time interval, data bursts that were not transmitted in the last available transmitting time interval.

11. The apparatus according to claim 10, wherein the data bursts are a group of data packets marked with same timestamp information.

12. The apparatus according to claim 7, wherein the data bursts are a group of data packets marked with same timestamp information.

\* \* \* \* \*